US012654627B2

(12) United States Patent
Xu et al.

(10) Patent No.: US 12,654,627 B2
(45) Date of Patent: Jun. 16, 2026

(54) DISPLAY ADJUSTMENT METHOD AND APPARATUS

(71) Applicant: Yinwang Intelligent Technologies Co., Ltd., Shenzhen (CN)

(72) Inventors: Zhou Xu, Nanjing (CN); Xiaolong Wang, Nanjing (CN); Qinglei Li, Nanjing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/495,062

(22) Filed: Oct. 26, 2023

(65) Prior Publication Data

US 2024/0051475 A1 Feb. 15, 2024

Related U.S. Application Data

(63) Continuation of application No. PCT/CN2021/091408, filed on Apr. 30, 2021.

(51) Int. Cl.
*B60R 11/02* (2006.01)
*B60K 35/60* (2024.01)
(Continued)

(52) U.S. Cl.
CPC .......... *B60R 11/0229* (2013.01); *B60K 35/60* (2024.01); *G06V 20/59* (2022.01);
(Continued)

(58) Field of Classification Search
CPC ......... B60R 11/0229; B60R 2011/0015; B60R 2011/0092; G06V 20/59; G06V 40/161;
(Continued)

(56) References Cited

U.S. PATENT DOCUMENTS

2008/0187187 A1* 8/2008 Tezuka ................. H04N 23/661
382/118
2009/0316057 A1* 12/2009 Campbell .............. B60K 35/53
348/836
(Continued)

FOREIGN PATENT DOCUMENTS

EP 0813340 A1 12/1997
JP 2005029040 A 2/2005
(Continued)

OTHER PUBLICATIONS

Office Action in Japanese Appln. No. 2023-566647, mailed on Nov. 12, 2024, 10 pages (with English translation).
(Continued)

*Primary Examiner* — Matthew David Kim
(74) *Attorney, Agent, or Firm* — Fish & Richardson P.C.

(57) ABSTRACT

This application discloses a display adjustment method and apparatus. One example method includes: A display adjustment apparatus may obtain sensing information, where the sensing information is used to determine a facial area of a target user. The display adjustment apparatus may further adjust, based on a position of the facial area, a position of a display corresponding to the target user, so that an adjusted position of the display is suitable for the user to view.

20 Claims, 7 Drawing Sheets

(51) Int. Cl.

| | | |
|---|---|---|
| *G06V 20/59* | (2022.01) | |
| *G06V 40/16* | (2022.01) | |
| *B60K 35/65* | (2024.01) | |
| *B60R 11/00* | (2006.01) | |

(52) U.S. Cl.
CPC ............ *G06V 40/161* (2022.01); *B60K 35/65* (2024.01); *B60K 35/658* (2024.01); *B60K 2360/741* (2024.01); *B60K 2360/77* (2024.01); *B60R 2011/0015* (2013.01); *B60R 2011/0092* (2013.01); *G06V 2201/07* (2022.01)

(58) Field of Classification Search
CPC .... G06V 2201/07; B60K 35/00; B60K 35/65; B60K 2360/77; B60K 35/658; B60K 35/60; B60K 2360/741
USPC ........................................................ 348/837
See application file for complete search history.

(56) References Cited

U.S. PATENT DOCUMENTS

| | | | | |
|---|---|---|---|---|
| 2010/0087951 | A1 | 4/2010 | Mimura | |
| 2011/0080489 | A1* | 4/2011 | Chen | H04N 23/64 |
| | | | | 348/222.1 |
| 2012/0304067 | A1* | 11/2012 | Han | G06F 3/005 |
| | | | | 715/728 |
| 2014/0092015 | A1* | 4/2014 | Xing | G06V 40/176 |
| | | | | 345/158 |
| 2015/0009415 | A1* | 1/2015 | Wong | H04N 9/3194 |
| | | | | 715/746 |
| 2015/0055822 | A1* | 2/2015 | Zhou | G06F 21/32 |
| | | | | 382/103 |
| 2017/0053284 | A1* | 2/2017 | Votaw | G06Q 20/3278 |
| 2018/0068170 | A1* | 3/2018 | Kohlmeier-Beckmann | |
| | | | | H04N 23/90 |
| 2020/0139965 | A1* | 5/2020 | Hanna | B60W 30/0956 |
| 2021/0097766 | A1* | 4/2021 | Palangie | G06F 3/017 |
| 2022/0070385 | A1* | 3/2022 | Van Os | H04N 23/62 |
| 2022/0107684 | A1* | 4/2022 | Files | G06F 1/1681 |
| 2023/0034307 | A1* | 2/2023 | Harada | G06V 40/103 |
| 2023/0164423 | A1* | 5/2023 | Xu | H04N 23/611 |
| | | | | 348/222.1 |
| 2023/0171370 | A1* | 6/2023 | Tenback | H04N 23/69 |
| | | | | 348/77 |
| 2024/0122513 | A1* | 4/2024 | Tahara | G08G 1/16 |
| 2024/0134315 | A1* | 4/2024 | Zeng | G02F 1/13471 |

FOREIGN PATENT DOCUMENTS

| | | |
|---|---|---|
| JP | 2006324952 A | 11/2006 |
| JP | 2008279155 A | 11/2008 |
| JP | 2009224841 A | 10/2009 |
| JP | 3169755 U | 8/2011 |
| JP | 2014169022 A | 9/2014 |
| JP | 2015093648 A | 5/2015 |

OTHER PUBLICATIONS

Extended European Search Report in European Appln. No. 21938457.5, mailed on May 8, 2024, 7 pages.

\* cited by examiner

Display

Front seat

Rear seat

| |
|---|
| S101: Obtain sensing information, where the sensing information is used to determine a facial area of a target user |

| |
|---|
| S102: Adjust, based on a position of the facial area of the target user, a position of a display corresponding to the target user |

DISPLAY ADJUSTMENT METHOD AND APPARATUS

CROSS-REFERENCE TO RELATED APPLICATIONS

This application is a continuation of International Application No. PCT/CN2021/091408, filed on Apr. 30, 2021, the disclosure of which is hereby incorporated by reference in its entirety.

TECHNICAL FIELD

This application relates to the field of vehicle control, and in particular, to a display adjustment method and apparatus.

BACKGROUND

An in-vehicle infotainment system is a focus of development of an intelligent vehicle. A vehicle-mounted display is an important component of the in-vehicle infotainment system. In a cockpit, a seat of a user is usually fixed, and consequently a range in which the user can move is limited. Therefore, in the system, it is not suitable for a user who takes a rear seat to select a proper viewing angle based on a position of a display behind a front seat. In this case, the position of the display needs to be adjusted, so that the display is in a position suitable for the user to view. The position adjustment of the display includes but is not limited to adjustment of a display direction of the display and a horizontal position and a vertical position of the display relative to the user. It may be understood that, if the display direction of the display is not suitable for the user to view, visual effect of viewing the display by the user is decreased, and user experience is affected.

However, currently, adjustment precision of a manner of adjusting a position of a display is not high.

SUMMARY

This application provides a display adjustment method and apparatus, to improve adjustment precision of a position of a display.

The display adjustment method provided in this application may be performed by an electronic apparatus supporting a display adjustment function. The electronic apparatus can be abstracted as a computer system. The electronic apparatus supporting the display adjustment function in this application may alternatively be referred to as a display adjustment apparatus. The display adjustment apparatus may be the entire electronic apparatus, or may be some components in the electronic apparatus, for example, a chip related to the display adjustment function, like a system chip or an image chip. The system chip is alternatively referred to as a system on chip (SoC), or referred to as an SoC chip. Specifically, the display adjustment apparatus may be a terminal apparatus or a vehicle-mounted device like a vehicle-mounted computer or a head unit in a vehicle, or may be a system chip, an image chip, or another type of chip that can be disposed in a computer system in a vehicle or a vehicle-mounted device.

According to a first aspect, a display adjustment method is provided.

For example, a display adjustment apparatus is an execution body. The method includes: A display adjustment apparatus may obtain sensing information, where the sensing information is used to determine a facial area of a target user. The display adjustment apparatus may further adjust, based on a position of the facial area, a position of a display corresponding to the target user.

According to the method, the display adjustment apparatus may adjust the display based on a position of the facial area, so that an adjusted position of the display is suitable for the user to view. This can improve viewing effect of the target user, and therefore improve adjustment precision of the position of the display.

In a possible design, the display adjustment apparatus may adjust the position of the display when the position of the facial area exceeds a reference area, so that an adjusted position of the facial area is in the reference area.

According to this design, the display adjustment apparatus may adjust the position of the display based on a position relationship between the facial area and the reference area, to improve adjustment precision of the position of the display.

In a possible design, the display adjustment apparatus may adjust the position of the display when a distance between the position of the facial area and a position of a reference point exceeds a threshold, so that an adjusted distance between the position of the facial area and the position of the reference point is less than the threshold.

According to this design, the display adjustment apparatus may adjust the position of the display based on the position relationship between the facial area and the reference point, to improve adjustment precision of the position of the display.

In a possible design, the sensing information may include sensing information of a first area and sensing information of a second area, the first area is an area captured before the display is adjusted, and the second area is an area captured after the display is adjusted. The display adjustment apparatus may adjust the position of the display when a distance between a position that is of the facial area and that is in the first area and a reference point in the first area is greater than or equal to the threshold, so that in the second area, a distance between the facial area of the target user and a reference point in the second area is less than or equal to the threshold.

According to this design, the adjusted position of the display may be closer to the position of the reference point determined based on the sensing information, to further improve adjustment precision of the position of the display.

In a possible design, the threshold is preconfigured, or the threshold corresponds to the target user. When the threshold corresponds to the target user, the display may be adjusted based on a personalized setting of the user, to further improve adjustment precision of the position of the display for the target user.

In a possible design, the threshold corresponds to the target user, and the display adjustment apparatus may further obtain the threshold from a server based on information of the target user.

In a possible design, facial areas of a plurality of users may be determined based on first sensing information, and the display adjustment apparatus may determine the target user from the plurality of users based on distances between the facial areas of the plurality of users and the reference point in the first area.

According to this design, when the plurality of users may be determined by using the sensing information, the target user is determined from the plurality of users based on the distances between the facial areas of the plurality of users and the reference point in the first area, to further improve adjustment precision of the position of the display for the target user. The distance between the facial area of the target user and the reference point is the smallest of the distances between the facial areas of the plurality of users and the reference point.

In a possible design, facial areas of a plurality of users may be determined based on first sensing information, and the display adjustment apparatus may determine, based on the facial areas of the plurality of users, a user that is in the plurality of users and that has a first body operation as the target user.

According to this design, when the plurality of users may be determined by using the sensing information, the target user is determined from the plurality of users based on the body operation of the user, to further improve adjustment precision of the position of the display for the target user.

In a possible design, facial areas of a plurality of users may be determined based on first sensing information, and the display adjustment apparatus may determine one of the plurality of users as the target user in response to an indication operation of the user.

According to this design, when the plurality of users may be determined by using the sensing information, the target user is determined from the plurality of users based on the indication operation of the user, to further improve adjustment precision of the position of the display for the target user.

In a possible design, the display is disposed on a backrest of a first seat in a vehicle, the first seat is a front seat of a second seat on which the target user is located, and the display adjustment apparatus may further adjust the position of the display based on a first parameter, to further improve adjustment precision of the display. The first parameter includes at least one of a distance between the first seat and the second seat, an inclination angle of the first seat, an inclination angle of a headrest on which the display is located, a length of the backrest of the first seat, or a length of the headrest, where the headrest is located on the first seat.

In a possible design, the position of the display includes at least one of a display direction of the display, a horizontal position of the display relative to the target user, a vertical position of the display relative to the target user, or a near-far position of the display relative to the target user.

In a possible design, the sensing information is obtained by a visual sensor, and the visual sensor includes one or more of a camera and a radar.

In a possible design, the facial area of the target user is an eye area of the target user, to further improve adjustment precision of the display.

According to a second aspect, this application provides a display adjustment apparatus. The apparatus includes a processing module and an input/output module.

The input/output module may be configured to obtain sensing information, where the sensing information is used to determine a facial area of a target user. The processing module may adjust, based on a position of the facial area, a position of a display corresponding to the target user.

In a possible design, the processing module may adjust the position of the display when the position of the facial area exceeds a reference area, so that an adjusted position of the facial area is in the reference area.

In a possible design, the processing module may adjust the position of the display when a distance between the position of the facial area and a position of a reference point exceeds a threshold, so that an adjusted distance between the position of the facial area and the position of the reference point is less than the threshold.

In a possible design, the sensing information may include sensing information of a first area and sensing information of a second area, the first area is an area captured before the display is adjusted, and the second area is an area captured after the display is adjusted. The processing module may adjust the position of the display when a distance between a position that is of the facial area and that is in the first area and a reference point in the first area is greater than or equal to the threshold, so that in the second area, a distance between the facial area of the target user and a reference point in the second area is less than or equal to the threshold.

In a possible design, the threshold is preconfigured, or the threshold corresponds to the target user.

In a possible design, the input/output module may be further configured to obtain the threshold from a server based on information of the target user. In this case, the input/output module may include a transceiver or a communication interface.

In a possible design, facial areas of a plurality of users may be determined based on first sensing information, and the processing module may determine the target user from the plurality of users based on distances between the facial areas of the plurality of users and the reference point in the first area.

In a possible design, facial areas of a plurality of users may be determined based on first sensing information, and the processing module may determine a user that is in the plurality of users and that has a first body operation as the target user.

In a possible design, facial areas of a plurality of users may be determined based on first sensing information, and the processing module may determine one of the plurality of users as the target user in response to an indication operation of the user.

In a possible design, the display is disposed on a backrest of a first seat in a vehicle, the first seat is a front seat of a second seat on which the target user is located, and the processing module may further adjust the position of the display based on a first parameter. The first parameter includes at least one of a distance between the first seat and the second seat, an inclination angle of the first seat, an inclination angle of a headrest on which the display is located, a length of the backrest of the first seat, or a length of the headrest, where the headrest is located on the first seat.

In a possible design, the position of the display includes at least one of a display direction of the display, a horizontal position of the display relative to the target user, a vertical position of the display relative to the target user, or a near-far position of the display relative to the target user.

In a possible design, the sensing information is obtained by a visual sensor, and the visual sensor includes one or more of a camera and a radar.

In a possible design, the facial area of the target user is an eye area of the target user, to further improve adjustment precision of the display.

According to a third aspect, this application provides a computing device, including a processor. The processor is connected to a memory, the memory stores a computer program or instructions, and the processor is configured to execute the computer program or the instructions stored in the memory, so that the computing device performs the method in any one of the first aspect or the possible implementations of the first aspect.

According to a fourth aspect, this application provides a computer-readable storage medium. The computer-readable storage medium stores a computer program or instructions. When the computer program or the instructions are executed, a computer is enabled to perform the method according to any one of the first aspect or the possible implementations of the first aspect.

According to a fifth aspect, this application provides a computer program product. When a computer executes the computer program product, the computer is enabled to perform the method in any one of the first aspect or the possible implementations of the first aspect.

According to a sixth aspect, this application provides a chip. The chip is connected to a memory, and is configured to read and execute a computer program or instructions stored in the memory, to implement the method in any one of the first aspect or the possible implementations of the first aspect.

According to a seventh aspect, this application provides a vehicle. The vehicle includes the display adjustment apparatus in any one of the second aspect or the possible implementations of the second aspect, to implement the method in any one of the first aspect or the possible implementations of the first aspect.

According to an eighth aspect, this application provides a vehicle. The vehicle includes the chip and the execution apparatus in the sixth aspect, to implement the method according to any one of the first aspect or the possible implementations of the first aspect.

Based on the technical solutions provided in this application, a display adjustment apparatus may obtain sensing information, and adjust, based on a facial area determined by using the sensing information, a position of a display corresponding to a target user, so that an adjusted position of the display is suitable for the user to view. This can improve viewing effect of the target user, and therefore improve adjustment precision of the position of the display.

Optionally, the display adjustment apparatus may further improve adjustment precision based on a position relationship between the facial area of the target user and a reference area or a reference point. The reference area and the reference point may be set at a fixed position, or may be variable, may be determined based on postures of different users, or may be determined based on historical data of the users.

Optionally, if the sensing information includes sensing information of a first area and sensing information of a second area, where the sensing information of the first area is captured before the display is adjusted, and the sensing information of the second area is captured after the display is adjusted, the display adjustment apparatus may adjust the position of the display based on that a distance between a position that is of the facial area and that is in the first area and a reference point in the first area is greater than or equal to a threshold, so that the distance between the position that is of the facial area and that is in the second area and the reference point in the second area is less than (or equal to) the threshold, to further improve adjustment precision.

Optionally, the threshold may be set for the target user, for example, a historical setting of the target user, to adjust the display based on a personalized setting of the user.

Optionally, facial areas of a plurality of users may be determined by using the sensing information, and the display adjustment apparatus may determine, based on a distance between a facial area of each user and the reference point in the first area, and a first body operation or an indication operation of the user, one of the plurality of users as the target user, to further improve adjustment precision of the display for the target user.

Optionally, the display adjustment apparatus may flexibly adjust the position of the display based on at least one of the following parameters: a distance between the first seat and the second seat, an inclination angle of the first seat, an inclination angle of a headrest on which the display is located, a length of the backrest of the first seat, or a length of the headrest to further improve adjustment precision of the display.

Optionally, the position of the display includes at least one of a display direction of the display, a horizontal position of the display relative to the target user, a vertical position of the display relative to the target user, or a near-far position of the display relative to the target user.

Optionally, the sensing information is obtained by a visual sensor, and the visual sensor includes one or more of a camera and a radar.

Optionally, the facial area of the target user is an eye area of the target user, and adjusting the position of the display based on the eye area of the target user can further improve adjustment precision of the display.

DESCRIPTION OF EMBODIMENTS

This application is mainly applied to adjusting a position of a display disposed on a backrest of a front seat. The position of the display is adjusted based on a position of a facial area of a target user, to improve viewing effect of an adjusted display.

Figure 1:
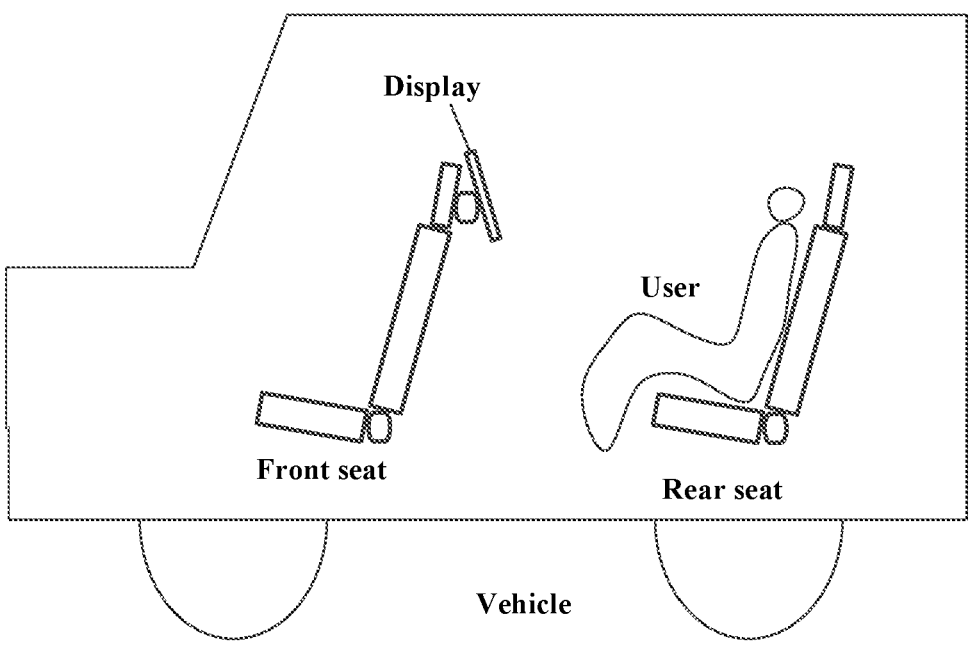
FIG. 1 is a schematic diagram of an application scenario according to an embodiment of this application.

A scenario in which a to-be-adjusted display in this application is located includes but is not limited to a vehicle, an airplane, a train, or a like scenario, and may also include a public place like a waiting room, a hospital, or a cinema. This is not specifically limited herein. FIG. 1 shows a possible application scenario of this application by using a vehicle as an example. As shown in FIG. 1, adjustment of a display on the vehicle is one of core scenarios of this application, but it should not be understood to all scenarios applicable to this application.

In this application, "and/or" describes an association relationship between associated objects, and indicates that three relationships may exist. For example, A and/or B may indicate the following cases: A exists alone, both A and B exist, and B exists alone, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

Figure 2:
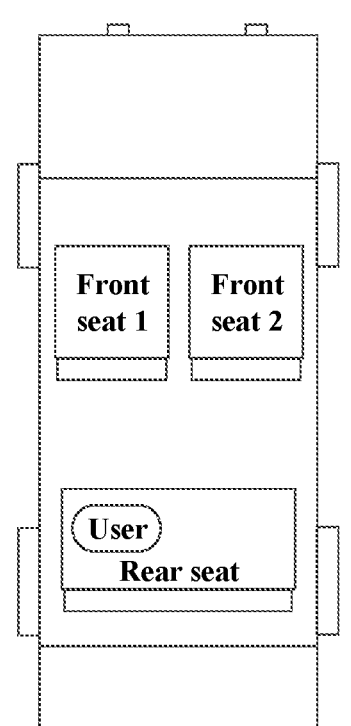
FIG. 2 is a schematic diagram of another application scenario according to an embodiment of this application.

The display shown in this application may have a display function, which is configured to display images such as a picture or a video to a user. The display may be disposed at a position like a seat backrest, a wall, a central control console, or a vehicle roof. For example, as shown in FIG. 2, if the display is located in a multi-row seat scenario, the display may be disposed behind a front seat, and an audience facing the display is a user taking a rear seat. In other words, a front side of the display faces the user. In addition, the display may alternatively be disposed at a position like a wall in front of a seat, a central control console, or a vehicle roof, and an audience facing the display is a user taking the seat. For example, in a single-row seat scenario, the display may be located at a facility in front of the single seat, or in the multi-row seat scenario, the display may be disposed at a facility in front of a front seat. The display may be located in direct front of the seat on which the user is located, or may be located diagonally in front of the seat on which the user is located. This is not specifically limited in this application.

Optionally, the display may have an image capturing function. For example, the display is integrated with a visual sensor, or is connected to a visual sensor. The visual sensor may be a camera or a radar. The visual sensor may be configured to capture image data. In this application, the image data may be a picture or a video captured by the camera, or may be a point cloud captured by the radar.

Optionally, a processor may obtain data captured by an independently disposed visual sensor. The processor may be disposed together with the display, or may be disposed separately from the display and connected through a communication link. The visual sensor includes one or more of sensors such as the radar and the camera. For example, the processor may obtain, by using an interface circuit, sensing information of the visual sensor connected to the processor, determine a face position of the user based on the sensing information, and adjust a position of the display. The processor and the visual sensor may be connected through a wired or wireless link. This is not limited in this application.

In a possible implementation, the display may have a shooting function, or in other words, an apparatus having a shooting function is built in the display. Alternatively, the display is connected to an apparatus having a shooting function. A shooting function is, for example, a function of taking a photo or shooting a video. An apparatus having a shooting function is, for example, a camera, a camera module, or a camera driver module. In this application, an example in which the apparatus having the shooting function is the camera is used for description.

Specifically, the camera may be built in the display, or may be connected to the camera to support the shooting function. If the display is connected to the camera, it needs to be ensured that positions of the display and the camera are relatively fixed. In other words, the display and the camera are connected in a hard connection manner. In addition, it needs to be further ensured that a display direction of the display is consistent with a shooting direction of the camera. In this application, the shooting direction of the camera is a direction that is perpendicular to an optical element of the camera and that faces a shot object.

In another possible implementation, the display may have a radar scanning function, or an apparatus having a radar scanning function is built in the display. Alternatively, the display is connected to an apparatus having a radar scanning function. The radar scanning function is, for example, a function of obtaining point cloud information through scanning. The point cloud information may include three-dimensional model data or image data in a radar scanning range, and can reflect position information of an object in three directions: an x-axis, a y-axis, and a z-axis. Therefore, with reference to a face recognition technology, positions of a facial area of the user in the point cloud in the three directions: the x-axis, the y-axis, and the z-axis may be obtained. The apparatus having the radar scanning function is, for example, a radar (including but not limited to a laser radar, an ultrasonic radar, or a millimeter-wave radar), a radar module, or a radar system. In this application, it can be ensured that a display direction of the display is consistent with a scanning direction of the radar, or in other words, the radar may scan a direction on which the user is located. For example, a scanning direction of a radar on a backrest of a first seat may face a direction of a second seat on which the user is located.

In addition, in this application, the position of the display includes at least one of the display direction of the display, a horizontal direction of the display relative to the user, or a vertical direction of the display relative to the user.

Figure 3:
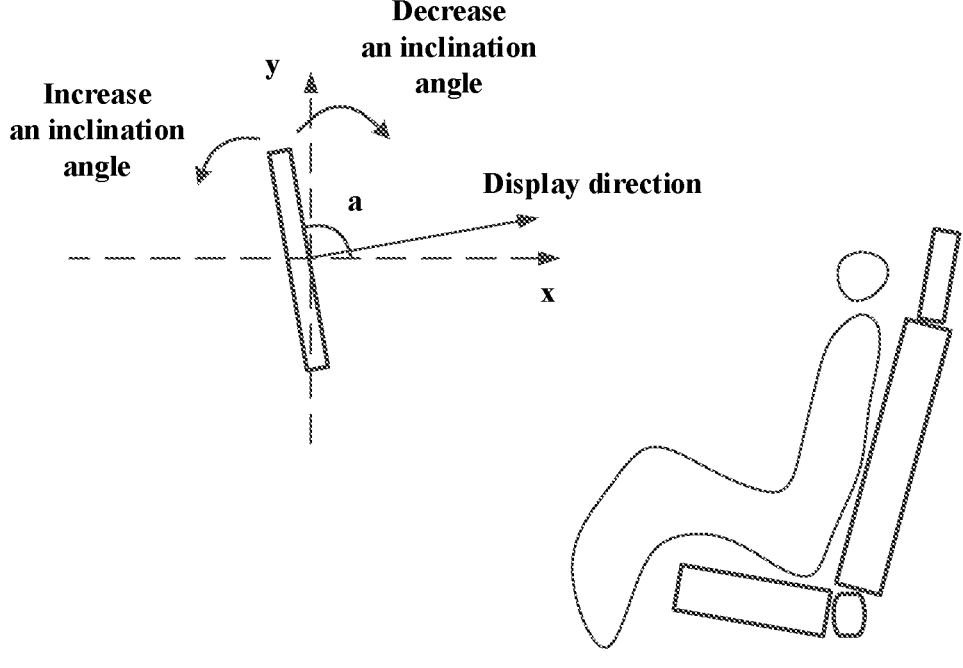
FIG. 3 is a schematic diagram of a display direction of a display according to an embodiment of this application.

It should be understood that the display direction of the display is a direction perpendicular to the display and facing the user. The display direction of the display may be divided into a display direction in a vertical direction and a display direction in a horizontal direction. FIG. 3 is used as an example. The display may be projected to a plane in direct front of a seat on which the user is located, to obtain a side view of the display. The display direction of the display in the vertical direction may be understood as a direction that is in FIG. 3 and that is perpendicular to a projection of the display on a plane on which an x-axis and a y-axis are located and that faces the seat on which the user is located. In FIG. 3, an inclination angle a may be used to represent the display direction of the display in the vertical direction. In addition, the display may be further projected to the plane on which the x-axis and the z-axis are located. The x-axis is the x-axis shown in FIG. 3, and a z-axis is perpendicular to the x-axis and the y-axis shown in FIG. 3. In this case, the display direction of the display in the horizontal direction may be understood as that the display is perpendicular to a projection of the display on a plane on which the x-axis and the z-axis are located, and faces the direction of the seat on which the user is located.

In a scenario like a vehicle, a position of a rear seat is relatively fixed, and usually does not move in a horizontal direction of the seat. Therefore, the display direction of the display in the horizontal direction may be fixed. For example, as shown in FIG. 2, the display is disposed on a backrest of a front seat 1, and horizontal rotation of the display is limited, so that the display direction of the display in the horizontal direction is always in a display direction that is suitable for viewing by the user and that is in a horizontal direction shown in FIG. 2. Therefore, when the display direction of the display in the horizontal direction does not need to be adjusted, this application may be applied to resolve a problem of adjustment precision of the display direction of the display in the vertical direction.

In addition, in some other scenarios, the method provided in this application is properly modified, so that the method is applied to resolve a problem of adjustment precision of the display direction of the display in the horizontal direction. For example, a position of a rear seat on which a user is located is shown in FIG. 2, and a display is disposed on a backrest of a front seat 2. Alternatively, a user is located in a rear seat area right behind a front seat 2, and a display is disposed on a backrest of a front seat 1. Alternatively, a user is located in a middle area of rear seats, and the display is disposed on a backrest of a front seat 1 or a front seat 2. Therefore, a display direction of the display in a horizontal direction and a vertical direction needs to be adjusted, so that the display direction of the display is suitable for the user to view.

It should be understood that the following uses the vertical direction as an example to describe a manner of adjusting a display direction of the display. For a manner of adjusting the display direction of the display in the horizontal direction, refer to a manner of adjusting the display direction of the display in the vertical direction.

It should be understood that, in this application, the display direction in the vertical direction of the display may be adjusted by increasing or decreasing an inclination angle of the display. FIG. 3 is still used as an example, the inclination angle is an included angle between the display in a side view and the horizontal direction (namely, an x direction shown in FIG. 3), and is represented as an angle a. It should be understood that, in a coordinate system shown in FIG. 3, when the display is rotated in a counter-clockwise direction, the inclination angle of the display may be increased, so that the display direction of the display in the vertical direction is higher. When the display is rotated in a clockwise direction, the inclination angle of the display may be decreased, so that the display direction of the display in the vertical direction is lower.

Figure 4:
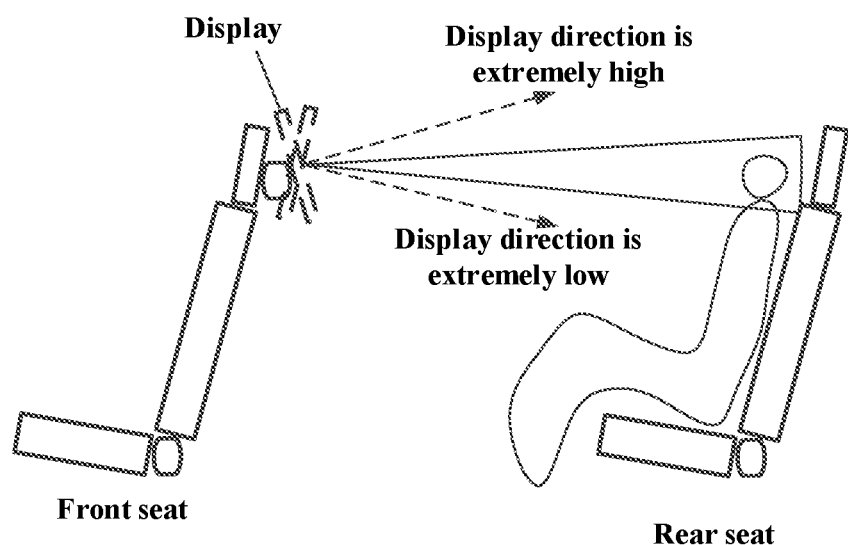
FIG. 4 is a schematic diagram of a display direction of another display according to an embodiment of this application.
Figures 5, 6:
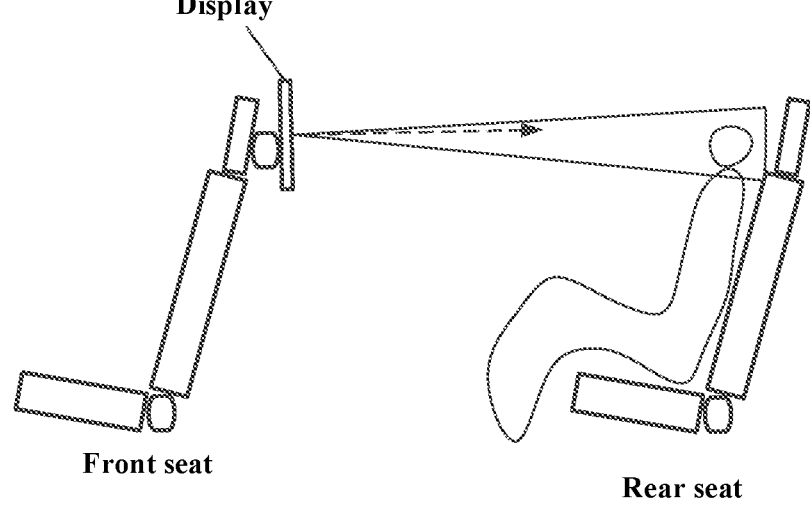
FIG. 5 is a schematic diagram of a display direction of another display according to an embodiment of this application.
FIG. 6 is a schematic flowchart of a display adjustment method according to an embodiment of this application.

Herein, with reference to a scenario shown in FIG. 4, a target of adjusting a display direction of a display is described. In FIG. 4, the display is disposed behind a headrest of a front seat, and a user is located in a rear seat. When the display direction of the display falls within a display direction range (referred to as a suitable range below) suitable for the user to view, viewing effect of the user is better. A display direction in a vertical direction is used as an example. If the display direction of the display in the vertical direction belongs to a range of a display direction in a vertical direction that is suitable for the user to view, the display direction of the display in the vertical direction does not need to be adjusted. If the display direction of the display in the vertical direction does not belong to the suitable range, the display direction of the display in the vertical direction needs to be adjusted, so that the display direction of the display in the vertical direction belongs to the suitable range, as shown in FIG. 5. The suitable range is represented by a sector area in FIG. 4 and FIG. 5. It should be understood that the suitable range may be related to a height and a sitting posture of the user. Therefore, for different users, the suitable range may be different.

As shown in FIG. 4, if the display direction of the display in the vertical direction is low for the user, that is, the display direction is lower than a lower limit of the suitable range shown in FIG. 4, in this case, the user needs to adjust the sitting posture to move a head down to obtain better viewing experience. In this case, the inclination angle of the display may be increased. In other words, the display is rotated in a counter-clockwise direction. If the display direction of the display in the vertical direction is high for the user, that is, the display direction is higher than an upper limit of the suitable range shown in FIG. 4, the user needs to adjust the sitting posture to move the head upward to obtain better viewing experience. In this case, the inclination angle of the display may be decreased. In other words, the display is rotated in a clockwise direction. If the display direction of the display in the vertical direction is low for the user, that is, the display direction is lower than the suitable range shown in FIG. 4, the user needs to adjust the sitting posture to move the head down to obtain better viewing experience. In this case, the inclination angle of the display may be increased. In other words, the display is rotated in a counter-clockwise direction.

It should be understood that the suitable range is at least related to a height of the user head when the user is sitting in a seat. In other words, for users with different heights or users with different sitting postures, the suitable range may be different. In addition, the suitable range is further related to a height of the display. For example, when the display is disposed in a front seat, the suitable range is further related to elements such as a backrest length of the front seat on which the display is located, a backrest inclination angle of the seat, and a high vibration angle and an inclination angle of the display on the backrest of the seat.

Similar to the display direction of the display, a horizontal position and a vertical position of the display relative to the user (referred to as a horizontal position and a vertical position of the display for short below) may also affect viewing experience of the user. FIG. 3 is used as an example. The horizontal position is a position of the display in a direction of a z-axis (not shown) perpendicular to an x-axis and a y-axis, and the vertical position is a position of the display in a direction of a y-axis. Therefore, in some cases, the horizontal position and the vertical position of the display need to be adjusted, to improve viewing experience of the user.

The following uses a modulation manner of the display direction as an example to describe a problem existing in a current position adjustment manner of the display. Currently, most means used to adjust a display direction of a display are manual adjustment or partial electric adjustment in a manual and electric manner. These manners need to be performed under manual control, and therefore have a problem of low adjustment precision. Therefore, a viewing requirement of a user cannot be well met.

To improve adjustment precision of a position of the display, an embodiment of this application provides a display adjustment method. The method may be implemented by a display position adjustment apparatus, and may be referred to as an adjustment apparatus for short below.

For example, as shown in FIG. 1, the adjustment apparatus may be used as a connection part between a headrest and the display, and is configured to fasten the display behind the headrest. In another example, there may be another connection relationship between the adjustment apparatus and the display. For example, the adjustment apparatus is used as a module or a component inside the display, or the adjustment apparatus is connected to the display in a wired or wireless manner. This is not specifically required in this application.

The adjustment apparatus and a to-be-adjusted display may be disposed in a system scenario. For example, if the to-be-adjusted display is located in a vehicle, the adjustment apparatus may also be disposed in the vehicle. For example, the adjustment apparatus is implemented by a central control system or a multimedia system of the vehicle. In addition, the adjustment apparatus may alternatively be disposed separately from the display to be adjusted. For example, the adjustment apparatus supports adjustment of a display direction of the display in a remote control manner.

In this application, the adjustment apparatus is an electronic apparatus that supports a display adjustment function, and may be an entire electronic apparatus, or may be some components in the electronic apparatus, for example, a chip related to the display adjustment function, like a system chip or an image chip. The system chip is alternatively referred to as an SoC, or referred to as an SoC chip. Specifically, the display adjustment apparatus may be a terminal apparatus or a vehicle-mounted device like a vehicle-mounted computer or a head unit in a vehicle, or may be a system chip, an image chip, or another type of chip that can be disposed in a computer system in a vehicle or a vehicle-mounted device, or may be a server (for example, a cloud server) or a chip in a server. The display adjustment apparatus may alternatively be abstracted as a computer system.

For example, the adjustment apparatus is a terminal device, and the terminal device may provide at least the following functions: obtaining sensing information, and adjusting a position of a display based on a position of a facial area indicated by the sensing information.

In this application, the sensing information may come from a visual sensor. The sensing information may be, for example, image information or point cloud information captured by the visual sensor, or may be information captured by the visual sensor and processed by the visual sensor. For example, the visual sensor may be a camera, and the sensing information may be picture (or video) information captured by the camera, or may be other information obtained by analyzing the picture information, for example, position information of the facial area that is of a user and that is obtained by analyzing the picture information. For another example, the visual sensor may be a radar, and the sensing information may be a point cloud captured by the radar, or may be information obtained by analyzing the point cloud, for example, position information of the facial area that is of the user and that is obtained by analyzing the point cloud information. It should be understood that the visual sensor may alternatively be an apparatus like an ultrasonic sensor.

In this application, the adjustment apparatus and the visual sensor may be disposed in a separated manner, and the position of the display may be adjusted based on communication between the adjustment apparatus and the visual sensor. The adjustment apparatus and the visual sensor may alternatively be integrated, and the adjustment apparatus may read the sensing information to implement position adjustment of the display. In this application, that A and B are integrated may mean that A and B are connected in a hard connection manner. To be specific, when a position of A changes, a position of B changes, a position change manner of A is consistent with a position change manner of B, and a position change amplitude of A is consistent with a position change amplitude of B.

The following describes this application with reference to the display adjustment method provided in embodiments of this application.

As shown in FIG. 6, the display adjustment method provided in embodiments of this application may include the following steps.

S101: Obtain sensing information, where the sensing information is used to determine a facial area of a target user.

As described above, the sensing information may be image data captured by a visual sensor like a camera or a radar, or may be information obtained after processing such as analysis performed on the image data. For example, if the visual sensor is the camera, the image data may be data of a picture, a video, or a like data type. If the visual sensor is the radar, the image data may be point cloud information.

In S101, an adjustment apparatus may identify the facial area of the target user, or the sensing information may include position information of the facial area of the target user. For example, the sensing information is a picture captured by the camera, and a facial area in the picture may be extracted through an edge detection algorithm or in a like manner.

It should be understood that the target user is an audience of the display. For example, when the display is located in a front seat, the target user may be one of users in a rear seat. For example, there are a plurality of users in a rear seat shown in FIG. 2, and the target user may be one of the plurality of users.

Optionally, when the image data captured by the visual sensor includes facial areas of a plurality of users, the adjustment apparatus may be further configured to determine the target user from the plurality of users. In other words, the adjustment apparatus may be further configured to: determine the facial areas of the plurality of users based on the sensing information, and determine the facial area of the target user from the facial areas of the plurality of users, or determine the target user from the plurality of users.

In a possible manner of determining the target user, if the sensing information includes sensing information of a first area, the target user may be determined from the plurality of users based on distances between the facial areas of the plurality of users and a reference point in the first area. The first area may be an area of the image data or a part area of the image data captured by the visual sensor. For example, when the visual sensor is the camera, the first area may include all pixel areas of a picture captured by the camera. In addition, the reference point in this application may be a specific pixel in the first area, for example, a central pixel, or a pixel at a vertex angle position in the first area. This is not specifically limited.

For example, a user whose facial area is closest to the reference point in the first area may be selected as the target user, or a user whose facial area is with the shortest distance from the reference point in the first area is determined as the target user.

In another possible manner of determining the target user, a user that is in the plurality of users and that has a first body operation is determined as the target user, where the first body operation is, for example, a gesture or an action like hand raising, nodding, left drawing, or right drawing. The first body operation may be obtained by using the visual sensor like the camera, the radar, or the ultrasonic sensor. Herein, an example in which a gesture made by the user is captured by using the camera is used to describe a manner of identifying the first body operation. The camera may capture a plurality of consecutive frames of images, and determine a position change feature of a feature pixel in the plurality of frames of images by identifying the feature pixel in the images. For example, the feature pixel is an edge image of a finger, a palm, or a face that is of the user and that is obtained by using an edge detection algorithm. If the position change feature meets a preset feature, it may be determined that a meaning of a mid-air gesture operation is a preset meaning corresponding to the feature. For example, the feature pixel includes edge images of a finger and a palm of the user. In the plurality of frames of images, the edge images of the finger and the palm of the user present a downward-up movement trend as time moves. In this case, a gesture made by the user may be identified as hand raising, and a user who performs a hand raising action may be further determined as the target user. For example, a user whose facial area is closest to the edge images of the finger and the palm is determined as the target user.

Optionally, the first body operation may be performed by the target user based on information output by the adjustment apparatus. For example, the adjustment apparatus may prompt the target user to perform the first body operation through a speaker, a display, and/or in a like manner to facilitate identification of the target user in the plurality of users.

Still another possible manner of determining the target user is: determining one of the plurality of users as the target user in response to an indication operation of the user, where the indication operation is, for example, a touch operation like touch, tap, slide, or press performed by the user on the display. For example, after the facial areas of the plurality of users are identified, the display displays facial areas of the plurality of users, and detects the touch operation of the user in the facial area of the user. If the touch operation is detected in the facial area of the user, the user is used as the target user, and the facial area of the user is the facial area of the target user.

Alternatively, the indication operation may include a button triggering operation of the user, for example, a tap or double-tap operation. For example, the facial areas that are of the plurality of users and that are identified may be displayed on the display, and the facial areas of the plurality of users may be identified by using identifiers such as virtual icons, texts, or numbers. Then, the button triggering operation that is performed by the user and that corresponds to a virtual icon, a text, or a number on the display is detected, and a facial area corresponding to a button on which the triggering operation occurs is used as the facial area of the target user. Each button may correspond to a facial area of a user. For example, each button includes a virtual icon, a text, or a number corresponding to a facial area of a user. If it is detected that the user triggers an operation on a button, a user to which the facial area corresponding to the button belongs is used as the target user. The button herein may be a virtual button or a physical button of the display. This is not specifically limited.

S102: Adjust, based on a position of the facial area of the target user, a position of a display corresponding to the target user.

The display corresponding to the target user is a display that is being viewed by the target user. For example, the foregoing description describes a method for determining the target user when an image shot by the display includes the facial areas of the plurality of users. Similarly, in this application, in a scenario in which there are a plurality of displays, each display may determine a target user by using a similar method, that is, determine a correspondence between a target user and a display, so that the position of the display corresponding to the target user may be adjusted based on a position of a target area of the target user. In addition, if there is only one display in a cockpit (or in another scenario), the display is a display corresponding to the target user.

For example, the adjustment apparatus may adjust the position of the display based on a position of the facial area of the target user in the first image.

According to the foregoing method, the position of the display may be adjusted based on the position of the facial area of the target user, so that the adjusted position of the display is suitable for the user to view, to improve view effect of the target user.

Optionally, in S102, the first image is used as an example. When the position of the display is adjusted based on the facial area of the target user, the adjustment apparatus may extract, through an edge detection algorithm or in a like manner, a human-eye area in the image obtained through shooting, and adjust the display based on the human-eye area, to improve adjustment precision of the display.

In a possible example of S102, the adjustment apparatus may determine the facial area of the target user based on the sensing information, and when determining that a distance between the facial area of the target user and a reference point exceeds (or is greater than or equal to, or is not less than) a threshold, adjust the position of the display, so that the distance between the adjusted position of the facial area and a position of the reference point does not exceed (or is less than or equal to, or is not greater than) the threshold.

Specifically, if the sensing information includes the sensing information of the first area and the sensing information of the second area, as described above, the first area may be an area of the image data or a part area of the image data captured by the visual sensor. A second area is similar to the first area, and a difference lies in that the first area and the second area have different capturing occasions. The sensing information of the first area may be an area captured before the display is adjusted, and the second area may be an area captured after the display is adjusted. In this case, when the distance between the facial area and the reference point in the first image exceeds the threshold, the position of the display may be adjusted, so that in the second area, a distance between the facial area of the target user and a reference point in the second area does not exceed the threshold. In addition, for a manner of setting the reference point, refer to the foregoing description, and a position of the reference point in the first area is the same as a position of the reference point in the second area. For example, the reference point in the first area is a central pixel of the first area, and the reference point in the second area is a central pixel of the second area. The first area and the second area may be images of the target user captured by a same visual sensor.

It should be understood that when a distance between the facial area of the target user and a reference point in the image (including the first area and/or the second area) captured by the visual sensor does not exceed the threshold, it may be considered that the position of the display belongs to a suitable range. In other words, when the distance between the facial area of the target user and the reference point in the image captured by the visual sensor exceeds the threshold, it may be considered that the position of the display does not belong to the suitable range, and the position of the display needs to be adjusted.

Optionally, after the target area is determined based on the sensing information, the position of the display may be adjusted when the position of the facial area exceeds the reference area of the first area, so that the adjusted position of the facial area is located in the reference area of the second area. Similar to the reference point, a position of a reference area in the first area is the same as a position of a reference area in the second area. Optionally, when both the reference point and the reference area exist, the position of the reference area may include the position of the reference point, or the reference point is located inside the reference area.

The reference area may be an area in which the target user is comfortable to view the display with human eyes. For example, if the target area is located in the reference area, it may be considered that a position of the display is in the suitable range. In other words, when the position of the facial area exceeds the reference area, the position of the display is adjusted, so that the adjusted position of the facial area is in the reference area.

The following describes, by using an example, a feasible manner of adjusting the position of the display based on the facial area of the target user, to facilitate understanding of this application.

Manner 1: The distance between the facial area of the target user and the reference point in the first image is represented by a distance between a central pixel of the facial area (or an eye area) of the target user and the reference point.

Figure 7A:
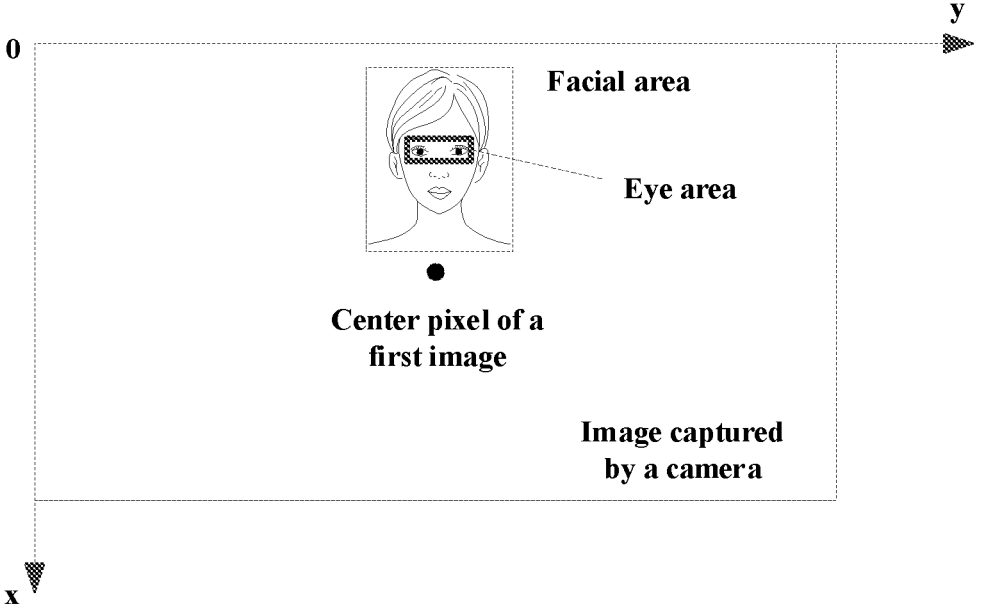
FIG. 7A is a schematic diagram of a first image according to an embodiment of this application.

FIG. 7A is used as an example. It is assumed that the reference point is a central pixel of an image captured by the camera, and coordinates of the central pixel are denoted as (m0,n0). The adjustment apparatus may identify the facial area of the user, determine a value relationship between the distance between the facial area and the reference point and the threshold, and determine whether the position of the display needs to be adjusted. If the distance between the central pixel of the eye area and the central pixel of the first image is used as the distance between the facial area and the reference point, for example, coordinates of a central pixel of the eye area are determined as (m1,n1), and a distance between the pixel and the central pixel of the first image may be represented as $\sqrt{(m1-m0)^2+(n1-n0)^2}$. If the distance is greater than or equal to the threshold, the adjustment apparatus needs to adjust the position of the display. If the distance is less than or equal to the threshold, the position of the display may not be adjusted.

For example, in an adjustment manner, a display direction of the display is adjusted, so that the distance between the central pixel of the eye area and the central pixel of the first image is shorter. FIG. 7A is used as an example. If m1 is greater than m0, the inclination angle of the display may be increased. On the contrary, if m1 is less than m0, the inclination angle of the display may be decreased. If n1 is greater than n0, a display angle of the display in a horizontal direction may be rotated rightward. On the contrary, if n1 is less than n0, a display angle of the display in the horizontal direction may be rotated leftward. Left and right are described by using a display direction of the display when the first image is shot as a reference.

In addition, a horizontal position and/or a vertical position of the display may be adjusted, so that the distance between the central pixel of the eye area and the central pixel of the first image is shorter. FIG. 7A is used as an example. If m1 is greater than m0, the display may be moved along a direction in which a value of an x-axis decreases shown in FIG. 7A. If m1 is less than m0, the display may be moved along a direction in which a value of an x-axis increases shown in FIG. 7A. If n1 is greater than n0, the display may be moved along a direction in which a value of a y-axis increases, as shown in FIG. 7A. On the contrary, if n1 is less than n0, the display may be moved along a direction in which a value of a y-axis decreases, as shown in FIG. 7A.

Manner 2: The distance between the facial area of the target user and the reference point in the first image is represented by a distance between the facial area (or the eye area) of the target user and the reference area of the first image.

Figure 7B:
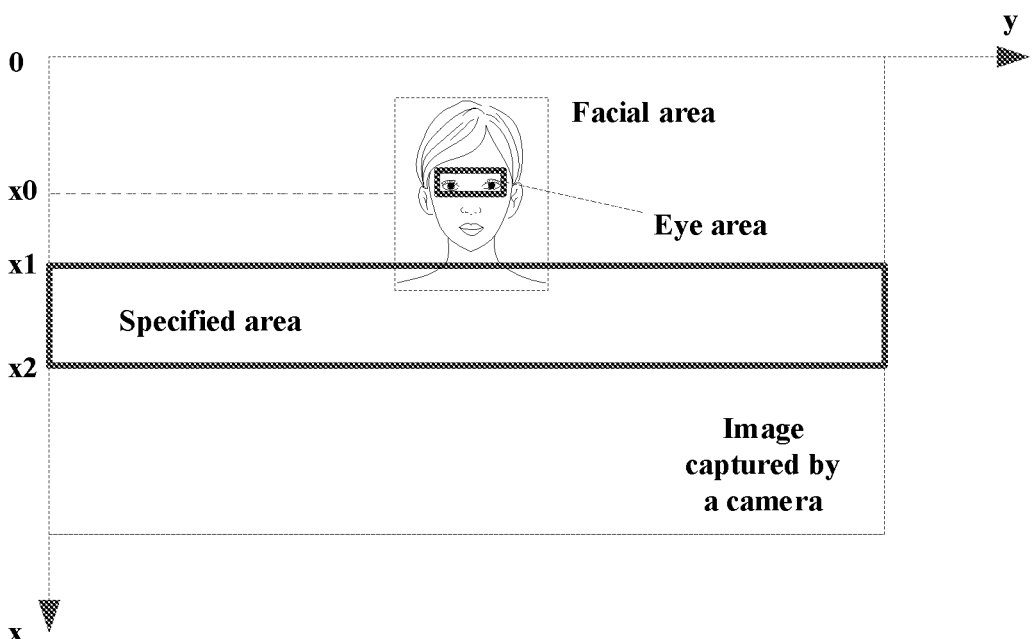
FIG. 7B is a schematic diagram of another first image according to an embodiment of this application.

FIG. 7B is used as an example. The reference point is the central pixel of the first image, the reference area in the first image includes the reference point, a shape of the reference area is a rectangle, the central pixel of the rectangle is the central pixel of the first image, and vertical coordinates of pixels in the reference area belong to a range of [x1,x2]. The adjustment apparatus may identify the facial area of the user, determine the distance between the facial area and the reference area, and determine, based on a value relationship between the distance and the threshold, whether a display direction of the display in a vertical direction needs to be adjusted. An eye area is used as an example. A vertical coordinate of the central pixel of the eye area is x0, and a distance between the pixel and a range of a vertical coordinate of a pixel in the reference area may be represented as min (|x1−x0|,|x2−x0|). If the distance is greater than or equal to the threshold, the adjustment apparatus needs to adjust the display direction of the display in the vertical direction. If the adjustment apparatus recognizes that x1≤x0≤x2, the central pixel of the eye area is in the reference area, that is, the display direction of the display in the vertical direction is appropriate. The display direction of the display in the vertical direction does not need to be adjusted.

For example, in an adjustment manner, the display direction of the display is adjusted, so that a distance between the vertical coordinate of the central pixel of the eye area and the reference area is shorter. FIG. 7B is used as an example. If x1 is less than x0, the inclination angle of the display may be increased; or if x2 is greater than x0, the inclination angle of the display may be decreased.

In addition, the position of the display may be adjusted, so that the distance between the central pixel of the eye area and the central pixel of the first image is shorter. FIG. 7B is used as an example. If x1 is less than x0, the display may be moved along a direction in which a value on the x-axis shown in FIG. 7B increases; or if x2 is greater than x0, the display may be moved along a direction in which a value on the x-axis shown in FIG. 7B decreases.

Similarly, in manner 2, whether the display direction and/or the horizontal position of the display in the horizontal direction need/needs to be adjusted may be determined based on a horizontal coordinate range of the reference area and the position of the facial area in the first image. If necessary, the display direction of the display in the horizontal direction may be adjusted with reference to the adjustment manner of adjusting the vertical direction of the display.

Manner 3: The position of the display is adjusted based on a position relationship between the facial area of the target user and the reference area, so that the adjusted target area is in the reference area. The reference area may be a reference area in the first image.

For example, the sensing information may include sensing information of the first area and sensing information of the second area. As described above, the sensing information of the first area may be an area captured before the display is adjusted, and the second area may be an area captured after the display is adjusted. If the facial area that is of the target user and that is in the first area is outside the reference area of the first area, the adjustment apparatus may adjust the position of the display, so that the facial area of the target user in the second area is in the reference area of the second area.

The reference area may be an area on which the target user is comfortable to view the display with human eyes. The first area as an example, the reference area may be a central area of the first area. A size and a shape of the reference area may be set. For example, a shape of the reference area may be a circle, a rectangle, a square, or an irregular shape. Optionally, a size and a shape of the reference area may be set based on a size and a shape of the first image.

Optionally, the position of the reference area and/or the reference point in this application may be determined based on experience.

Optionally, in the manner 1 to manner 3, when adjusting the position of the display, the adjustment apparatus may adjust the display direction of the display based on a specific angle (for example, adjust 1 degree (or another value) each time), and/or adjust the horizontal position and/or the vertical position of the display based on a specific step. Alternatively, the adjustment apparatus may adjust the position of the display based on a difference between the distance and the threshold. For example, a correspondence between the difference between the distance and the threshold and an adjustment angle in the display direction may be set, and the adjustment apparatus determines the adjustment angle of the display in the display direction based on the difference between the distance and the threshold; and/or a correspondence between the difference between the distance and the threshold and an adjustment angle in the display direction may be set, and the adjustment apparatus determines an adjustment step value of the horizontal position and/or the vertical position of the display based on the difference between the distance and the threshold. The difference between the distance and the threshold is positively correlated with the adjustment angle or step value, to improve adjustment efficiency.

After the position of the display is adjusted, the visual sensor may capture image data again, and repeatedly perform the foregoing adjustment method. In other words, after the position is adjusted, S101 to S102 may be repeatedly performed until after at least one adjustment, the eye area of the user in the second image captured by the visual sensor is located in the reference area of the image shot by the visual sensor.

The foregoing describes, in manner 1 and manner 2, an implementation of adjusting the position of the display based on the facial area of the target user. In actual use, the implementation of adjusting the position of the display based on the facial area of the target user should not be understood as being limited to the foregoing example.

In addition, at least one of the reference point, the threshold, and the size, the shape, or the position of the reference area in this application may be bound to the target user. In other words, the at least one of the reference point, the threshold, and the size, the shape, or the position of the reference area may have different values when target users are different. For ease of description, at least one of the reference point, the threshold, and the size, the shape, or the position of the reference area may be referred to as a user parameter in the following.

For example, the user parameter may be related to user information (or referred to as information of a user). The user information is, for example, information such as a user account, a facial area image, an identifier, a mobile phone number, or an in-vehicle infotainment account.

For example, the adjustment apparatus may store or obtain a binding relationship (or referred to as a mapping relationship or a correspondence) between a user parameter and user information from a server (for example, a cloud server), and search for user information bound to the user information of the target user in a case of determining whether the display needs to be adjusted.

The following uses an example to describe how to obtain the binding relationship between the user parameter and the user information:

Optionally, for the user information, the target user may input the user information to the adjustment apparatus or the server by using the display or another input apparatus before or in a process of viewing the display. Alternatively, the visual sensor may capture image data including the facial area of the user, and use the image data of the facial area of the user as the user information.

For the user parameter, the target user may further change the position of the display in a manner of manually adjusting the display. In this case, the adjustment apparatus or the server may determine the user parameter of the target user based on the position of the display that is manually adjusted by the user, so that a binding relationship between the user information of the target user and the user parameter may be obtained. For example, after the target user adjusts the display for the last time and/or after the display starts to play a multimedia file like audio and video, image data is shot by using the visual sensor, the position of the facial area of the target user in the image is determined, a central position of the facial area of the target user in the image is used as the reference point, and/or the reference area is determined based on the adjusted position of the facial area of the target user. In addition, optionally, the user may input the user parameter to the adjustment apparatus or the server by using a display or another input apparatus.

If the adjustment apparatus determines that the adjustment apparatus or the server stores the user parameter bound to the information about the target user, the adjustment apparatus may determine, based on the user parameter, whether the position of the display needs to be adjusted. For example, the user parameter includes coordinates of the reference point and a value of the threshold. After determining the coordinates of the reference point bound to the target user, the adjustment apparatus determines, in the manner 1, a distance between the facial area that is of the target user and that is in the first area and the reference point in the first area based on the coordinates, and determines, based on the value relationship between the distance and the threshold, whether the position of the display needs to be adjusted. If necessary, the position of the display is adjusted, the distance between facial areas of the target user in a second image of an adjusted second area is less than or equal to the threshold.

If the adjustment apparatus determines that the adjustment apparatus or the server does not store the user parameter bound to information about the target user, a default user parameter may be used to determine whether the position of the display needs to be adjusted. If necessary, the position of the display may be adjusted based on the default user parameter. For example, in the default user parameter, a reference point is a central pixel of an image captured by the visual sensor, and parameters such as a threshold, and a size, a shape, or a position of the reference area are all preset values.

In a possible example, in the method provided in an embodiment of this application, the adjustment apparatus may further adjust the position of the display based on a first parameter. The first parameter includes at least one of the following parameters: at least one of a distance between a first seat on which the display is located and a second seat on which the target user is located, an inclination angle of the first seat, an inclination angle of a headrest on which the display is located, a length of a backrest of the first seat, or a length of the headrest on which the display is located, where the headrest is located on the first seat.

Optionally, the step of adjusting the position of the display based on the first parameter may be performed after the position or the posture of the first seat on which the display is located and/or the second seat on which the target user is located is adjusted. Therefore, the position of the display can be adjusted based on a change of left-right position and the posture, to improve viewing experience. The position adjustment of the first seat and/or the second seat on which the target user is located may cause a change of a distance between the first seat and the second seat, and the posture adjustment of the first seat may cause a change of at least one of the inclination angle of the first seat, the inclination angle of the headrest on which the display is located, the length of the backrest of the first seat, or the length of the headrest on which the display is located.

It should be understood that the step of adjusting the position of the display based on the first transmission and the step of adjusting the position of the display based on the position of the facial area of the target user in the first image shown in FIG. 6 may be separately implemented, or may be implemented in a combined manner. For example, in this application, the position of the display may be adjusted at least once based on the first parameter, and the position of the display may be adjusted at least once based on the position of the facial area of the target user in the first image, to further improve adjustment precision of the position of the display and bring better viewing experience.

Figure 8:
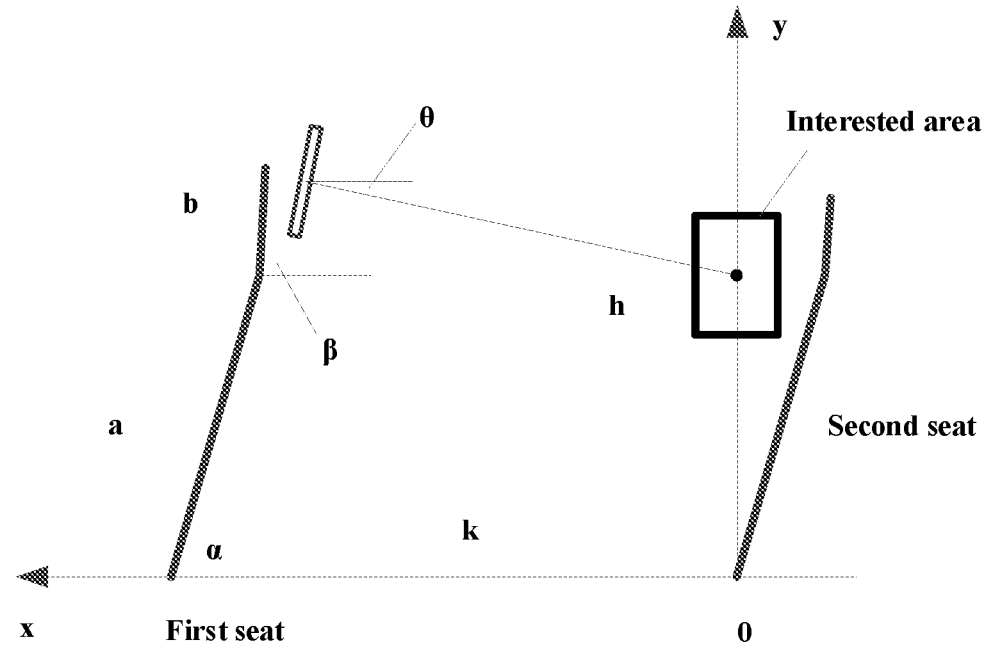
FIG. 8 is a schematic diagram of a first parameter according to an embodiment of this application.

With reference to FIG. 8, the following describes a manner of adjusting the inclination angle (namely, the display direction in the vertical direction) of the display based on the first parameter. It should be understood that, for steps of adjusting the display direction angle, the horizontal position, or the vertical position in the horizontal direction of the display based on the first parameter, reference may be made to implementation.

In FIG. 8, a first seat on which a display is located and a second seat on which a user is located are located in a same coordinate system, a position of the second seat is an origin of coordinates, and the first seat and the second seat may be located on an x-axis. In addition, in FIG. 8, a represents a length of the first seat, α represents an inclination angle of the first seat, b represents a length of a headrest on which the display on the first seat is located, β represents an inclination angle of the headrest, k is a distance between the first seat and the second seat, and h is a height (namely, a vertical coordinate) of a central position of an interested area, where a and/or b may be set to a fixed value.

h may be a central position of the interested area. A meaning of the interested area is that when the inclination angle of the display is controlled so that a vertical line perpendicular to a central point of the display overlaps with the interested area, it may be determined that the inclination angle of the display is suitable for most users to view. A position of the interested area may be determined based on a size (including a height and a width) and h of the interested area, where the size of the interested area may be a specific value. h may be a specified value, or may be determined based on a value like a height of the first seat, a height of the second seat, or an average height of users.

For example, if h is the height of the first seat, h meets the following formula:

$$h = a^* \sin \alpha.$$

It should be understood that the interested area determined according to the foregoing manner may represent a position that is generally suitable for the user to view, because, with a change of a height and a sitting posture of the user, positions that are suitable for different users to view may be different.

For example, according to FIG. 8, an adjustment apparatus may determine coordinates (m, n) of the central point of the display in the coordinate system, where (m, n) satisfies the following formula:

(Formula 1)

$$(m, n) = \left( k - a^* \cos \alpha - \left( \frac{b}{2} \right) * \cos \beta, \ a^* \sin \alpha - \left( \frac{b}{2} \right) * \sin \beta \right).$$

In formula 1, for ease of calculation, it is set that the display is disposed at a half length of the headrest of the first seat.

Further, for ease of calculation, that the vertical line of the central point of the display passes through the central position of the interested area may be used as an adjustment target, and the inclination angle of the display that needs to be adjusted is determined. In this application, the vertical line of the display is a ray that is perpendicular to the display and that faces a direction of the user, or a ray perpendicular to a front surface of the display.

For example, the inclination angle of the display is adjusted based on the angle γ between the display and the horizontal direction when that the vertical line of the central point of the display passes through the central point of the interested area is determined according to formula 1. In this case, the angle γ indicates an included angle between vertical line and a horizontal direction when the vertical line of the central point of the display passes through the central point of the interested area. γ can satisfy the following formula:

$$\gamma = \arctan[(n-h)/m].$$  (Formula 2)

m and n are respectively a horizontal coordinate and a vertical coordinate of the central point of the display, and values of m and n may be determined according to formula 1.

When the inclination angle of the display is adjusted based on the angle γ, the adjustment apparatus may determine a first target angle θ, and subsequently may adjust the angle between the vertical line of the display and the horizontal direction to the first target angle θ. The first target angle θ may alternatively be referred to as an expected angle.

For example, θ may satisfy the following formula:

$$\gamma = 180° - \theta - \gamma.$$  (Formula 3)

Optionally, in formula 2, an example in which the vertical line of the central point of the display passes through the central point of the interested area is used for calculation, to determine the angle γ. This application does not exclude that in actual adjustment, another reference point other than the central point of the interested area is selected based on, for example, a vertical coordinate of a reference point on the y-axis is h', where $h-h0 \leq h' \leq h+h0$, and a height of the interested area is $2*h0$. In this case, an angle $\gamma'$ may be determined, indicating an included angle between a vertical line and a horizontal direction when the vertical line of the central point of the display passes through the reference point. For example, $\gamma'$ may satisfy the following formula:

$$\gamma' = \arctan[(n-h'\gamma)/m]. \quad \text{(Formula 4)}$$

When the first target angle $\theta$ is determined based on the angle $\gamma'$, $\gamma$ in formula 3 may be replaced with $\gamma'$.

Optionally, the adjustment apparatus in this application may adjust the inclination angle of the display based on the first target angle $\theta$ by using a proportion integral differential (PID) algorithm. Specifically, an angle difference error=$\theta-\theta'$ may be used as an input of the PID algorithm, and the included angle between the vertical line of the display and the horizontal direction is adjusted through closed-loop control. $\theta'$ is an included angle (referred to as a current angle for short below) between the vertical line of the central point of the display and the horizontal direction before adjustment.

Figure 9:
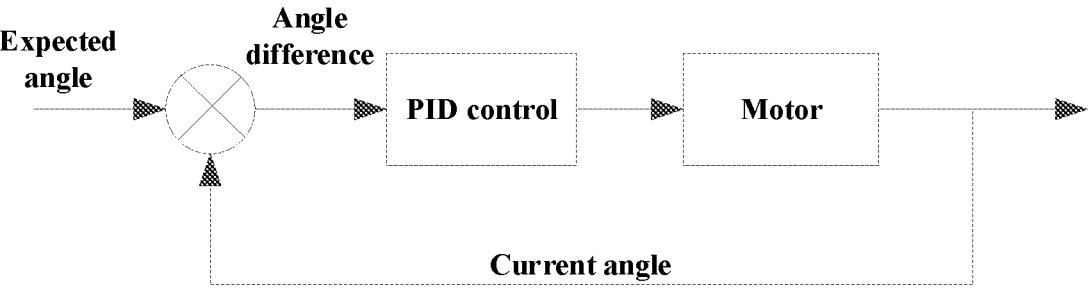
FIG. 9 is a schematic diagram of logic of a PID control method according to an embodiment of this application.

Processing logic of the PID algorithm is shown in FIG. 9. The adjustment apparatus may be connected to a motor (or referred to as a drive motor), or the adjustment apparatus may include a motor, and the motor may be configured to adjust a position of the display. In each round of adjustment, the adjustment apparatus may determine a first target angle $\theta$ (namely, an expected angle shown in FIG. 9) based on a first parameter, determine the angle difference based on a current angle $\theta'$ before this round of adjustment and the first target angle, and use the angle difference as the input of the PID algorithm. A PID controller controls the motor by using the PID algorithm to adjust the inclination angle of the display, and updates the current angle based on an adjustment result. Then, the foregoing steps are repeated in a next round of adjustment. In any round of adjustment, the angle difference can be determined based on the first target angle and the current angle after a previous round of adjustment, and the angle difference is used as the input to perform PID control.

Figure 10:
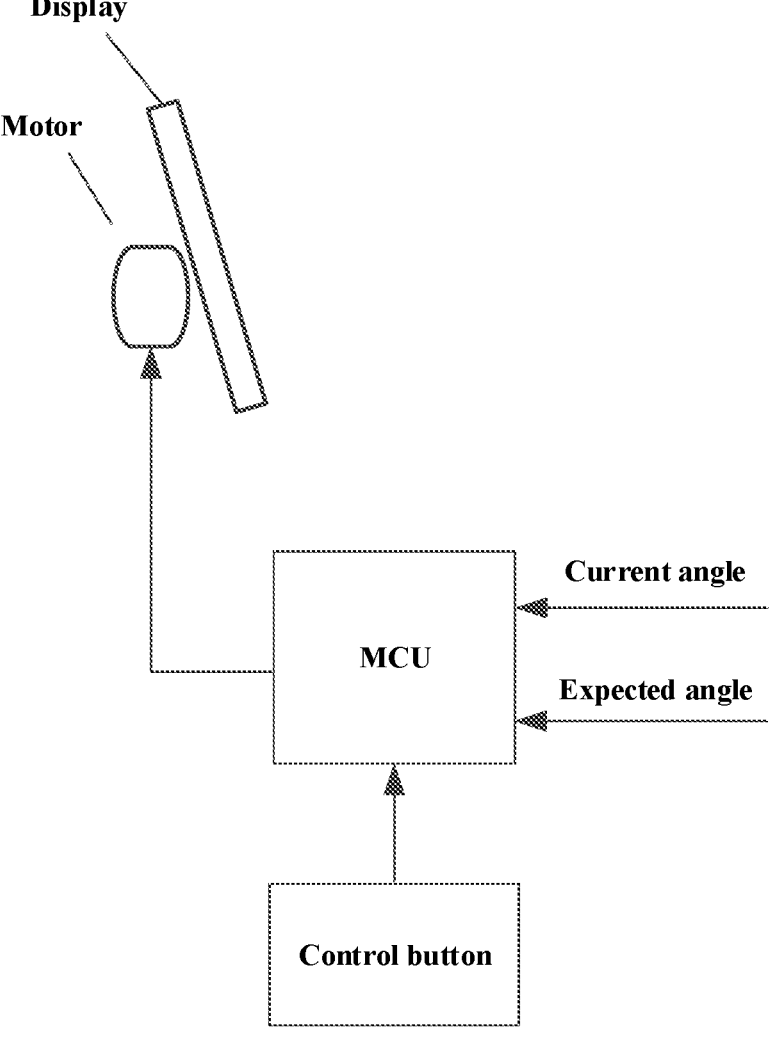
FIG. 10 is a schematic diagram of logic of a display adjustment method according to an embodiment of this application.

As shown in FIG. 10, a micro control unit (MCU) in the adjustment apparatus may alternatively be used to obtain a button control result, that is, obtain the first parameter, determine the current angle and the expected angle based on the first parameter, perform PID control based on the angle difference between the current angle and the expected angle, and control, based on a PID control result by using a motor control signal, the motor to drive the inclination angle of the display to be adjusted.

Based on the foregoing content and a same concept, this application further provides an adjustment apparatus, configured to implement a function of adjusting the position of the display in the display adjustment method described in the foregoing method embodiments. Therefore, the adjustment apparatus has beneficial effects of the foregoing method embodiments. The adjustment apparatus may include any structure in FIG. 11 to FIG. 13, or may be implemented by a combination of any plurality of structures in FIG. 11 to FIG. 13.

Figure 11:
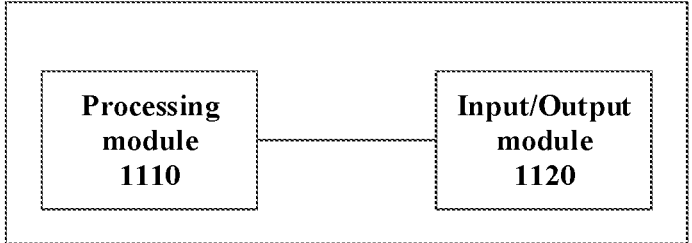
FIG. 11 is a schematic diagram of a structure of a display adjustment apparatus according to an embodiment of this application.

For example, FIG. 11 is a schematic diagram of a structure of a possible adjustment apparatus. The structure may include a processing module 1110 and an input/output module 1120. For example, the structure shown in FIG. 11 may be a terminal device, or a functional component having the adjustment apparatus shown in this application. When the structure is the terminal device or another electronic device, the input/output module 1120 may include a visual sensor, and may further include an apparatus (or referred to as a human-computer interaction apparatus) that is configured to support a human-computer interaction function, like a touchscreen, a speaker, or a microphone, and a transceiver that supports wired and/or wireless communication of the adjustment apparatus. Alternatively, the input/output module 1120 may support communication with a visual sensor, and an apparatus that is configured to support a human-computer interaction function or a communication function, like a touchscreen, a camera, a speaker, or a microphone. For example, the input/output module 1120 is a communication interface. The processing module 1110 may be a processor, for example, a central processing unit (CPU). When the structure is a functional component of the adjustment apparatus shown in this application, the input/output module 1120 may be an interface circuit, and is configured to communicate with an apparatus that is configured to support the human-computer interaction function, like a touchscreen, a visual sensor, a radar, or a speaker sensing microphone. The processing module 1110 may be a processor. When the structure is a chip or a chip system, the input/output module 1120 may be an input/output interface of the chip, and the processing module 1110 may be a processor of the chip, and may include one or more central processing units. It should be understood that the processing module 1110 in an embodiment of this application may be implemented by a processor or a processor-related circuit component, and the input/output module 1120 may be implemented by a transceiver, an apparatus configured to support the human-computer interaction function, or a related circuit component.

It should be understood that the input/output module 1120 may be a functional module, and the functional module can complete both an output operation and an input operation. An information receiving and sending process is used as an example, when a sending operation is performed, the input/output module 1120 may be considered as a sending module, and when a receiving operation is performed, the input/output module 1120 may be considered as a receiving module. Alternatively, the input/output module 1120 may include two functional modules. The input/output module 1120 may be considered as a general term of the two functional modules. The two functional modules are a sending module and a receiving module, and the sending module is configured to complete a sending operation.

The adjustment apparatus shown in FIG. 11 may be a terminal or a vehicle, or may be a chip in a terminal or a vehicle. The adjustment apparatus may implement the display adjustment method shown in FIG. 6 and the foregoing optional embodiments. The adjusting apparatus may include the processing module 1110 and the input/output module 1120.

The processing module 1110 may be configured to perform S102 in the method shown in FIG. 6, or may be configured to perform any one of the steps related to target area identification, target user identification, obtaining of a first parameter, calculation of an expected angle, obtaining of a current angle, adjustment of a display, or the like in the foregoing optional embodiments. The input/output module 1120 may be configured to perform S101 in the method shown in FIG. 6, or may be configured to perform any step related to shooting and/or human-computer interaction in the foregoing optional embodiments.

When performing the step shown in S101, the input/output module 1120 may be configured to obtain sensing information, where the sensing information is used to determine a facial area of a target user. When performing the step shown in S102, the processing module 1110 may be configured to adjust, based on a position of the facial area of the target user, a position of a display corresponding to the target user.

Specifically, when the position of the facial area exceeds a reference area, the processing module 1110 may adjust the position of the display, so that the adjusted position of the facial area is in the reference area.

Alternatively, when a distance between the position of the facial area and a position of a reference point exceeds a threshold, the processing module 1110 may adjust the position of the display, so that the distance between the adjusted position of the facial area and the position of the reference point is less than the threshold.

The input/output module 1120 may include a visual sensor like a camera or a radar, or may support communication with the visual sensor, to receive sensing information from the visual sensor.

In a possible design, the sensing information may include sensing information of a first area and sensing information of a second area, the first area is an area captured before the display is adjusted, and the second area is an area captured after the display is adjusted. The processing module 1110 may adjust the position of the display when a distance between a position that is of the facial area and that is in the first area and a reference point in the first area is greater than or equal to the threshold, so that in the second area, a distance between the facial area of the target user and a reference point in the second area is less than or equal to the threshold.

In a possible design, the threshold is preconfigured, or the threshold corresponds to the target user.

In a possible design, the input/output module 1120 may be further configured to obtain the threshold from a server based on information of the target user. In this case, the input/output module 1120 may include a transceiver or a communication interface.

In a possible design, facial areas of a plurality of users may be determined based on first sensing information, and the processing module 1110 may determine the target user from the plurality of users based on distances between the facial areas of the plurality of users and the reference point in the first area.

In a possible design, facial areas of a plurality of users may be determined based on first sensing information, and the processing module 1110 may determine a user that is in the plurality of users and that has a first body operation as the target user.

In a possible design, facial areas of a plurality of users may be determined based on first sensing information, and the processing module 1110 may determine one of the plurality of users as the target user in response to an indication operation of the user.

In a possible design, the processing module 1110 may further adjust the position of the display based on a first parameter. The first parameter includes at least one of a distance between the first seat and the second seat, an inclination angle of the first seat, an inclination angle of a headrest on which the display is located, a length of the backrest of the first seat, or a length of the headrest, where the headrest is located on the first seat.

In a possible design, the position of the display includes at least one of a display direction of the display, a horizontal position of the display relative to the target user, a vertical position of the display relative to the target user, or a near-far position of the display relative to the target user.

In a possible design, the sensing information is obtained by a visual sensor, and the visual sensor includes one or more of a camera and a radar.

In a possible design, the facial area of the target user is an eye area of the target user, to further improve adjustment precision of the display.

Figure 12:
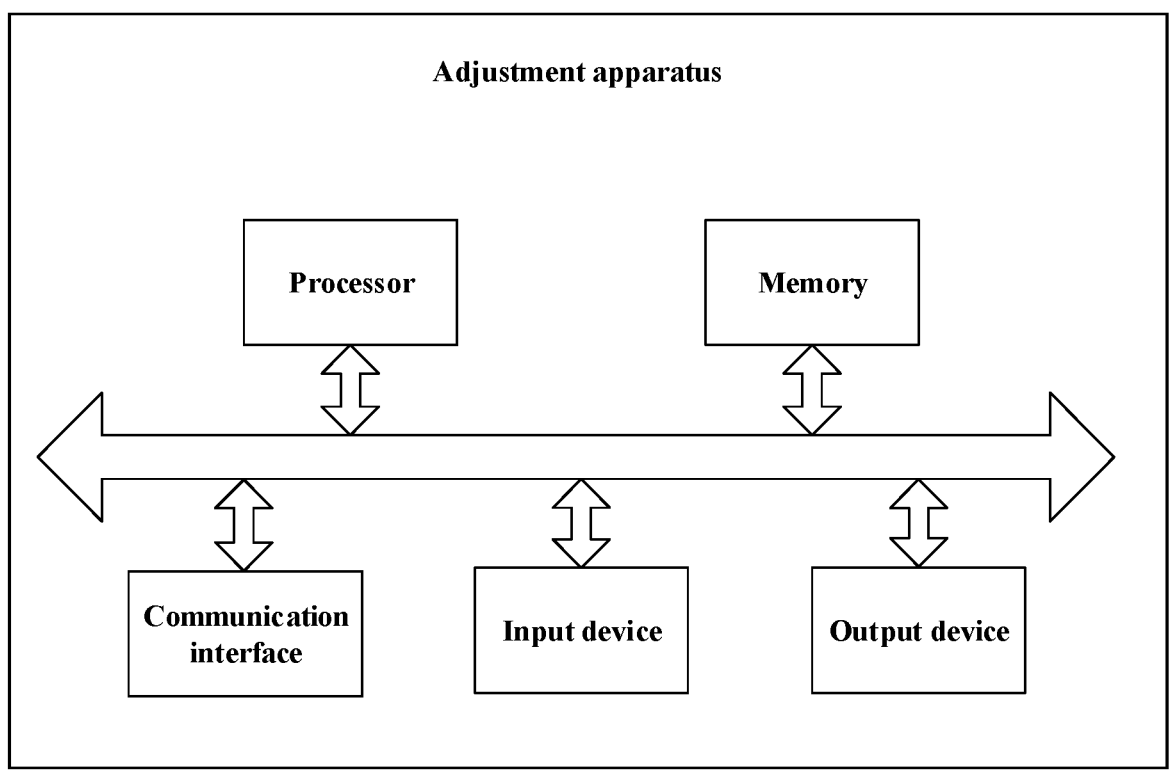
FIG. 12 is a schematic diagram of a structure of another display adjustment apparatus according to an embodiment of this application.

FIG. 12 is a schematic diagram of a structure of another adjustment apparatus, configured to perform actions performed by the adjustment apparatus according to an embodiment of this application. The adjustment apparatus may be a terminal or a vehicle, or may be a chip in a terminal or a vehicle. As shown in FIG. 12, the adjustment apparatus may include at least one component of a processor, a memory, a communication interface, an input device, or an output device. The processor is mainly configured to implement a processing operation provided in embodiments of this application, for example, control the adjustment apparatus to execute a software program to implement the display adjustment method provided in embodiments of this application. The memory is mainly configured to store a software program and data. The input device may include a visual sensor, or include a human-computer interaction apparatus like a microphone or an ultrasonic sensor, and a receiver that supports wired and/or wireless reception of the adjustment apparatus. The input device may be configured to perform an action like a sensing information capturing action, gesture capturing, or information receiving from a server in embodiments of this application. The output device may include a display, a speaker, or a transmitter that supports wired and/or wireless sending of the adjustment apparatus. The output device may be configured to present information to the user. For example, the input device may be configured to prompt the user to perform an action like performing a first gesture operation and sending information to the server. When the adjustment apparatus does not include an input device and/or an output device, the communication interface may be configured to communicate with the input device and/or the output device.

For ease of description, FIG. 12 shows only one memory and one processor. In an actual adjustment apparatus product, there may be one or more processors and one or more memories. The memory may alternatively be referred to as a storage medium, a storage device, or the like. The memory may be disposed independently of the processor, or may be integrated with the processor. This is not limited in embodiments of this application.

Optionally, the processor may perform the steps of the processing module 1110 shown in FIG. 11, and at least one of a communication interface, an input device, or an output device implements the steps of the input/output apparatus 1120 shown in FIG. 11.

It should be understood that, the processor may be a chip. For example, the processor may be a field programmable gate array (FPGA), an application-specific integrated circuit (ASIC), a system on a chip (SoC), a central processing unit (CPU), a network processor (NP), a digital signal processor (DSP), a micro controller unit (MCU), a programmable logic device (PLD), or another integrated chip.

It should be noted that, the processor in an embodiment of this application may be an integrated circuit chip, and has a signal processing capability. In an implementation process, the steps in the foregoing method embodiments can be implemented by a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in an embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the system and methods described in this specification includes but is not limited to these memories and any memory of another proper type.

Figure 13:
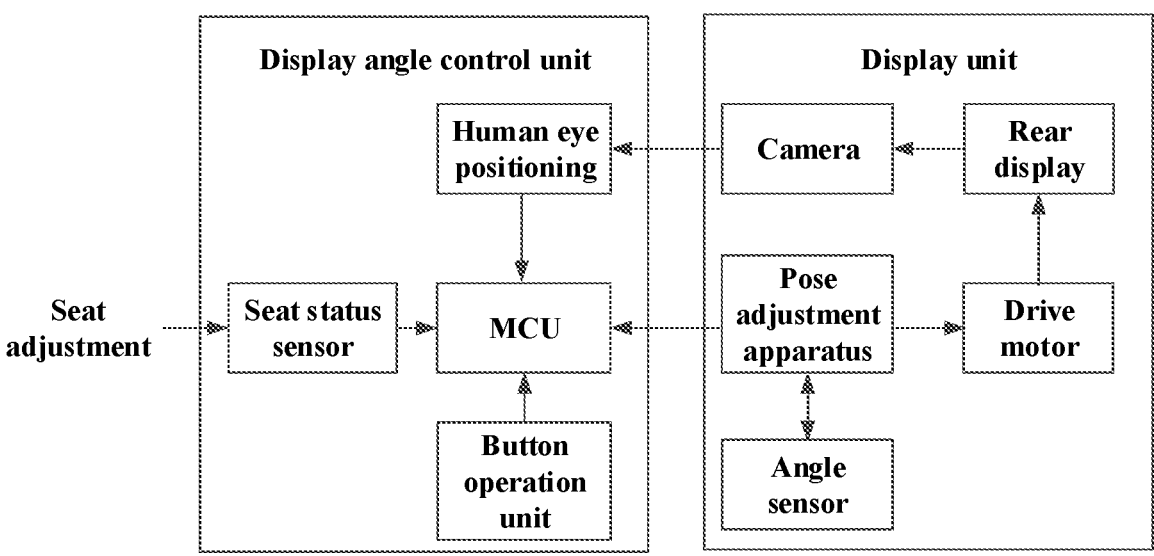
FIG. 13 is a schematic diagram of a structure of another display adjustment apparatus according to an embodiment of this application.

The following describes another possible structure of the adjustment apparatus with reference to a structure shown in FIG. 13. As shown in FIG. 13, the adjustment apparatus may include a display angle control unit and a display unit.

For example, in this application, the display unit may capture a face image of a rear user, identify a position of an eye area in the image, and send the image to the display angle control unit. Then, the display angle control unit adjusts a display direction of the display based on the position of the eye area in the image, to implement display adjustment.

In addition, as shown in FIG. 13, the display angle control unit may include an MCU, a seat status sensor, a button operation unit, and a human eye positioning unit. The display unit may include a camera, a display, a pose adjustment apparatus, a drive motor, and an angle sensor.

With reference to a structure shown in FIG. 13, the following describes an example of a display position adjustment method provided in an embodiment of this application.

Specifically, after the position or posture of a first seat on which the display is located and/or a second seat on which a user is located is adjusted, the seat status sensor may input an obtained first seat parameter of the first seat and/or the second seat to the MCU, and the button operation unit may be configured to transmit a second seat parameter after the first seat and/or the second seat are/is adjusted to the MCU. The first seat parameter includes but is not limited to a horizontal position of the first seat and/or the second seat, and the horizontal position may be used to determine a distance between the first seat and the second seat. The second seat parameter includes but is not limited to an inclination angle of the seat and/or an inclination angle of a seat headrest. In addition, when a seat length and a headrest length are adjustable, a seat parameter may further include the seat length and/or the headrest length. It should be understood that the seat status sensor and the button operation unit may be disposed as a unit, a module, or a physical component.

The MCU may be configured to determine an expected angle based on a received seat position parameter.

The pose adjustment apparatus may be configured to: obtain the expected angle from the MCU, obtain a current angle from the angle sensor, perform PID control based on a difference between the expected angle and a current angle, and control, based on a PID control result, the drive motor to adjust the inclination angle of the display. The pose adjustment apparatus may include a PID controller, or the pose adjustment apparatus may be connected to the PID controller.

Then, the camera captures a first image, and the human eye positioning unit performs detection and positioning on an eye area of a target user in the first image, determines a position of the eye area in the first image, and transfers position information to the MCU. The position information may indicate coordinates of the eye area in the image.

Then, the MCU determines, based on the position information, whether the position of the display needs to be adjusted. If the position of the display needs to be adjusted, the position of the display may be adjusted by the pose adjustment apparatus or the MCU.

For execution of actions performed by the modules, units, or components in the adjustment apparatus shown in FIG. 13, refer to the descriptions in the method embodiments of this application. It should be understood that, in embodiments of this application, module division is an example, and is merely logical function division. In an actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

It should be understood that structures of the display adjustment apparatuses shown in any one of FIG. 11 to FIG. 13 may be combined with each other. Related design details of the display adjustment apparatus shown in any one of FIG. 11 to FIG. 13 and the optional embodiments may refer to each other, or refer to the display adjustment method shown in FIG. 6 and related design details of the optional embodiments. Details are not described herein again.

Based on the foregoing content and a same concept, this application provides a computing device, including a processor. The processor is connected to a memory, the memory is configured to store a computer program or instructions, and the processor is configured to execute the computer program stored in the memory, so that the computing device performs the method in the foregoing method embodiments.

Based on the foregoing content and a same concept, this application provides a computer-readable storage medium. The computer-readable storage medium stores a computer program or instructions. When the computer program or the instructions is/are executed, a computing device is enabled to perform the method in the foregoing method embodiments.

Based on the foregoing content and a same concept, this application provides a computer program product. When a computer executes the computer program product, a computing device is enabled to perform the method in the foregoing method embodiments.

Based on the foregoing content and a same concept, this application provides a chip. The chip is connected to a memory, and is configured to read and execute a computer program or instructions stored in the memory, so that a computing device performs the method in the foregoing method embodiments.

Based on the foregoing content and a same concept, an embodiment of this application provides an apparatus. The apparatus includes a processor and an interface circuit. The interface circuit is configured to receive a computer program or instructions and transmit the computer program or the instructions to the processor. The processor runs the computer program or the instructions to perform the method in the foregoing method embodiments.

It should be understood that, in embodiments of this application, module division is an example, and is merely logical function division. In an actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that each procedure and/or block in the flowcharts and/or block diagrams, and combinations of the procedures and/or blocks in the flowcharts and/or block diagrams may be implemented by computer program instructions. These computer program instructions may be provided to a processor of a general-purpose computer, a special-purpose computer, an embedded processor, or another programmable data processing device to generate a machine, such that the instructions executed by the processor of the computer or another programmable data processing device generate an apparatus for implementing a specific function in one or more procedures in the flowcharts and/or one or more blocks in the block diagrams.

These computer program instructions may be stored in a computer-readable memory that can instruct the computer or any other programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the protection scope of this application. In this case, this application is intended to cover these modifications and variations of this application provided that they fall in the scope of the claims and their equivalent technologies.

What is claimed is:

1. A display adjustment method, comprising:
obtaining sensing information, wherein the sensing information comprises information related to a facial area of a target user; and
adjusting, based on a position of the facial area, a position of a display corresponding to the target user, wherein the adjusting, based on a position of the facial area, a position of a display corresponding to the target user comprises:
obtaining, based on a binding relationship between user information of different users and different thresholds, a threshold that corresponds to the target user; and
adjusting the position of the display when a distance between the position of the facial area and a position of a reference point exceeds the threshold that corresponds to the target user, so that an adjusted distance between the position of the facial area and the position of the reference point is less than the threshold, wherein the threshold is greater than 0.

2. The method according to claim 1, wherein the adjusting, based on a position of the facial area, a position of a display corresponding to the target user comprises:
adjusting the position of the display when the position of the facial area exceeds a reference area, so that an adjusted position of the facial area is in the reference area.

3. The method according to claim 1, wherein the sensing information comprises sensing information of a first area and sensing information of a second area, the first area is an area captured before the display is adjusted, and the second area is an area captured after the display is adjusted; and
the adjusting the position of the display when a distance between the position of the facial area and a position of a reference point exceeds a threshold, so that an adjusted distance between the position of the facial area and the position of the reference point is less than the threshold comprises:
adjusting the position of the display when a distance between a position that is of the facial area and that is in the first area and a reference point in the first area is greater than or equal to the threshold, so that in the second area, a distance between the facial area of the target user and a reference point in the second area is less than or equal to the threshold.

4. The method according to claim 1, wherein the sensing information comprises sensing information of a first area, and the method further comprises:

determining facial areas of a plurality of users based on the sensing information; and determining the target user from the plurality of users based on distances between the facial areas of the plurality of users and a reference point in the first area.

5. The method according to claim 1, wherein the method further comprises:

determining facial areas of a plurality of users based on the sensing information; and determining a user that is in the plurality of users and that has a first body operation as the target user.

6. The method according to claim 1, wherein the method further comprises:

determining facial areas of a plurality of users based on the sensing information; and determining one of the plurality of users as the target user in response to an indication operation of the user.

7. The method according to claim 1, wherein the display is disposed on a backrest of a first seat in a vehicle, the first seat is a front seat of a second seat on which the target user is located, and the method further comprises:

adjusting the position of the display based on a first parameter, wherein the first parameter comprises at least one of a distance between the first seat and the second seat, an inclination angle of the first seat, an inclination angle of a headrest on which the display is located, a length of the backrest of the first seat, or a length of the headrest, wherein the headrest is located on the first seat.

8. The method according to claim 1, wherein the position of the display comprises at least one of a display direction of the display, a horizontal position of the display relative to the target user, a vertical position of the display relative to the target user, or a near-far position of the display relative to the target user.

9. The method according to claim 1, wherein the sensing information is obtained by a visual sensor, and the visual sensor comprises one or more of a camera or a radar.

10. A display adjustment apparatus, comprising:

at least one processor;

a non-transitory computer-readable storage medium coupled to the at least one processor and storing programming instructions for execution by the at least one processor, the programming instructions instruct the at least one processor to perform the following operations:

obtaining sensing information, wherein the sensing information comprises information related to a facial area of a target user; and adjusting, based on a position of the facial area, a position of a display corresponding to the target user, wherein the adjusting, based on a position of the facial area, a position of a display corresponding to the target user comprises:

obtaining, based on a binding relationship between user information of different users and different thresholds, a threshold that corresponds to the target user; and adjusting the position of the display when a distance between the position of the facial area and a position of a reference point exceeds the threshold that corresponds to the target user, so that an adjusted distance between the position of the facial area and the position of the reference point is less than the threshold, wherein the threshold is greater than 0.

11. The apparatus according to claim 10, wherein the programming instructions instruct the at least one processor to perform:

adjust the position of the display when the position of the facial area exceeds a reference area, so that an adjusted position of the facial area is in the reference area.

12. The apparatus according to claim 10, wherein the sensing information comprises sensing information of a first area and sensing information of a second area, the first area is an area captured before the display is adjusted, and the second area is an area captured after the display is adjusted; and wherein the programming instructions instruct the at least one processor to perform:

adjust the position of the display when a distance between a position that is of the facial area and that is in the first area and a reference point in the first area is greater than or equal to the threshold, so that in the second area, a distance between the facial area of the target user and a reference point in the second area is less than or equal to the threshold.

13. The apparatus according to claim 10, wherein the sensing information comprises a sensing information of a first area, and wherein the programming instructions instruct the at least one processor to perform:

determine facial areas of a plurality of users based on the sensing information; and determine the target user from the plurality of users based on distances between the facial areas of the plurality of users and a reference point in the first area.

14. The apparatus according to claim 10, wherein the programming instructions instruct the at least one processor to perform:

determine facial areas of a plurality of users based on the sensing information; and determine a user that is in the plurality of users and that has a first body operation as the target user.

15. The apparatus according to claim 10, wherein the programming instructions instruct the at least one processor to perform:

determine facial areas of a plurality of users based on the sensing information; and determine one of the plurality of users as the target user in response to an indication operation of the user.

16. The apparatus according to claim 10, wherein the display is disposed on a backrest of a first seat in a vehicle, the first seat is a front seat of a second seat on which the target user is located, and wherein the programming instructions instruct the at least one processor to perform:

adjust the position of the display based on a first parameter, wherein the first parameter comprises at least one of a distance between the first seat and the second seat, an inclination angle of the first seat, an inclination angle of a headrest on which the display is located, a length of the backrest of the first seat, or a length of the headrest, wherein the headrest is located on the first seat.

17. The apparatus according to claim 10, wherein the position of the display comprises at least one of a display direction of the display, a horizontal position of the display relative to the target user, a vertical position of the display relative to the target user, or a near-far position of the display relative to the target user.

18. A non-transitory computer-readable storage medium, wherein the computer-readable storage medium stores a computer program or instructions, and when the computer program or the instructions are executed by a computing device, the computing device is enabled to perform operations comprising:

obtaining sensing information, wherein the sensing information comprises information related to a facial area of a target user; and adjusting, based on a position of the facial area, a position of a display corresponding to the target user, wherein the adjusting, based on a position of the facial area, a position of a display corresponding to the target user comprises:

obtaining, based on a binding relationship between user information of different users and different thresholds, a threshold that corresponds to the target user; and adjusting the position of the display when a distance between the position of the facial area and a position of a reference point exceeds the threshold that corresponds to the target user, so that an adjusted distance between the position of the facial area and the position of the reference point is less than the threshold, wherein the threshold is greater than 0.

19. The non-transitory computer-readable storage medium according to claim 18, wherein the sensing information comprises sensing information of a first area, and the operations further comprise:

determining facial areas of a plurality of users based on the sensing information; and determining the target user from the plurality of users based on distances between the facial areas of the plurality of users and a reference point in the first area.

20. The non-transitory computer-readable storage medium according to claim 18, wherein the operations further comprise:

determining facial areas of a plurality of users based on the sensing information; and determining a user that is in the plurality of users and that has a first body operation as the target user.

* * * * *